United States Patent [19]

Tzikas et al.

[11] Patent Number: 5,530,104
[45] Date of Patent: Jun. 25, 1996

[54] FIBER REACTIVE DISAZO DYES HAVING A 2-VINYLSULFONYL-5-SULFOANILINE DIAZO COMPONENT OR A PRECURSOR THEREOF

[75] Inventors: Athanassios Tzikas, Pratteln; Claudia Carisch, Reinach, both of Switzerland

[73] Assignee: Ciba-Geigy Corporation, Tarrytown, N.Y.

[21] Appl. No.: 324,826

[22] Filed: Oct. 18, 1994

Related U.S. Application Data

[63] Continuation of Ser. No. 23,985, Feb. 26, 1993, Pat. No. 5,391,718.

[30] Foreign Application Priority Data

Mar. 5, 1992 [CH] Switzerland ................ 691/92

[51] Int. Cl.⁶ ................ C09B 62/513; D06P 1/384
[52] U.S. Cl. ................ 534/642
[58] Field of Search ................ 534/642

[56] References Cited

U.S. PATENT DOCUMENTS

| | | | |
|---|---|---|---|
| 4,036,825 | 7/1977 | Fuchs | 534/642 |
| 4,134,887 | 1/1979 | Fuchs | 534/642 |
| 4,425,270 | 1/1984 | Yamada et al. | 534/637 |
| 4,430,259 | 2/1984 | Mischke | 534/642 |
| 4,649,193 | 3/1987 | Meininger et al. | 534/638 X |
| 4,652,634 | 3/1987 | Mischke | 534/642 |
| 4,730,038 | 3/1988 | Meinsinger et al. | 534/638 X |
| 4,935,501 | 6/1990 | Tzikas | 534/634 |
| 5,047,514 | 9/1991 | Scheibli et al. | 534/637 |
| 5,093,484 | 3/1992 | Herd | 534/642 |
| 5,233,026 | 8/1993 | Tzikas | 534/632 X |
| 5,356,440 | 10/1984 | Galafassi et al. | 534/642 |

FOREIGN PATENT DOCUMENTS

| | | |
|---|---|---|
| 0133843 | 3/1985 | European Pat. Off. . |
| 0292825 | 11/1988 | European Pat. Off. . |
| 2110325 | 6/1972 | France . |
| 47-38034 | 9/1972 | Japan ................ 534/642 |
| 1372368 | 10/1974 | United Kingdom . |

OTHER PUBLICATIONS

Herd, Chemical Abstracts, 110:214752k (1989).

*Primary Examiner*—Fiona T. Powers
*Attorney, Agent, or Firm*—Kevin T. Mansfield

[57] ABSTRACT

Reactive dyes of the formula

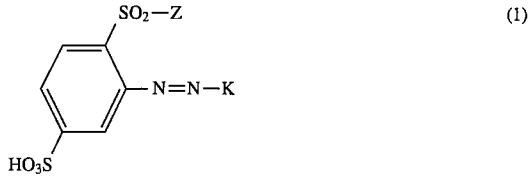

(1)

in which K and Z are as defined in claim 1, are suitable in particular for the dyeing and printing of cellulose-containing fibre material and produce dyeings and prints having good fastness properties in high coloristic yield.

2 Claims, No Drawings

FIBER REACTIVE DISAZO DYES HAVING A 2-VINYLSULFONYL-5-SULFOANILINE DIAZO COMPONENT OR A PRECURSOR THEREOF

This is a continuation of Ser. No. 08/023,985 filed Feb. 26, 1993, now U.S. Pat. No. 5,395,718.

The present invention relates to novel reactive dyes, processes for their preparation and their use for the dyeing and printing of fibre materials.

The practice of dyeing using reactive dyes has recently led to increased demands on the quality of the dyeings and the economy of the dyeing process. As a result thereof, there is still a need for novel reactive dyes exhibiting improved properties, in particular with respect to application.

For the dyeing of cellulose-containing materials, such as cotton, today's demands are for reactive dyes which have sufficient affinity and whose unfixed portions can, at the same time, be easily washed off. Furthermore, they should exhibit high reactivity and produce, in particular, dyeings having high degrees of fixation. The known dyes do not fulfill these requirements in all their properties.

Accordingly, the object of the present invention is to find novel, improved reactive dyes for the dyeing and printing of cellulose-containing fibre materials which possess the qualities characterised above to a high degree. The novel dyestuffs should be distinguished in particular by high fixation yields and high stability of the fibre-to-dye bond. Furthermore, the dye not fixed on the fibre should be easy to wash off. Moreover, they should produce dyeings having good general fastness properties, for example light and wet fastness properties.

It has been found that by using the novel reactive dyes defined below this object can be largely achieved.

Accordingly, the invention relates to reactive dyes of the formula

(1)

in which Z is β-sulfatoethyl, β-thiosulfatoethyl, β-phosphatoethyl, β-acyloxyethyl, β-haloethyl or vinyl and K is the radical of a coupling component.

K is in particular the radical of a monocouplable water-soluble coupling component, which additionally may contain azo groups, or the radical of a dicouplable water-soluble coupling component from the series of aminobenzenes or phenols, in particular of sulfonated or carboxylated aminobenzenes or phenols; of naphthalenes or naphthols, in particular of sulfonated or carboxylated naphthalenes or naphthols; of aminonaphthols, in particular of sulfonated aminonaphthols; of acylaminonaphthols, in particular of sulfonated acylaminonaphthols containing the acyl radical of an alkane- or alkenecarboxylic acid each having 1 to 4, preferably 2 to 4, C atoms in the alkyl or alkenyl moiety or from the series of pyrazolones, pyridones or pyrimidines, it being possible for K also to contain, apart from the substituents customary in dyes, one or more fibre-reactive groups.

K is preferably the radical of a naphthalene, phenylazonaphthalene, naphthylazonaphthalene, benzene, phenylazobenzene, naphthylazobenzene, 6-hydroxypyrid-2-one, 1-phenyl- or 1-naphthylpyrazolone, pyridonylazobenzene, pyridonylazonaphthalene or pyrimidinylazonaphthalene, which is further substituted in a suitable manner.

Examples which may be mentioned from the series of substituents are lower alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, hydroxy-$C_1$–$C_2$alkoxy, for example hydroxyethoxy, acylamino groups having 1 to 8 carbon atoms, in particular alkanoylamino groups, such as acetylamino or propionylamino or benzoylamino; phenylamino, N,N-di-β-hydroxyethylamino, N,N-di-β-sulfatoethylamino, sulfobenzylamino, N,N-disulfobenzoylamino; alkoxycarbonyl having 1 to 4 carbon atoms in the alkoxy radical, such as methoxycarbonyl or ethoxycarbonyl; alkylsulfonyl having 1 to 4 carbon atoms, such as methylsulfonyl or ethylsulfonyl; trifluoromethyl, nitro, cyano, halogen, such as fluorine, chlorine or bromine; carbamoyl, N-alkylcarbamoyl having 1 to 4 carbon atoms in the alkyl radical, such as N-methylcarbamoyl or N-ethylcarbamoyl; sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl; N-(β-hydroxyethyl)sulfamoyl, N,N-di-(β-hydroxyethyl)sulfamoyl, N-phenylsulfamoyl, ureido, hydroxyl, carboxyl, sulfomethyl, sulfo, benzoyl or acyl.

Fibre-reactive groups are understood to mean the customary aliphatic or heterocyclic radicals containing detachable groups or atoms, such as defined below.

Preferred dyes are monoreactive dyes of the formula

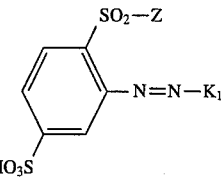
(2)

in which $K_1$ is a radical of the formula

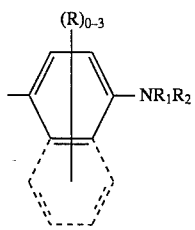
(2a)

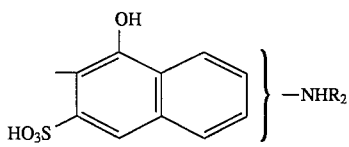
(2b)

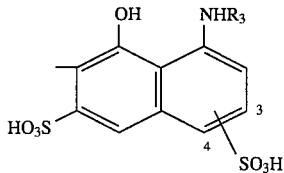
(2c)

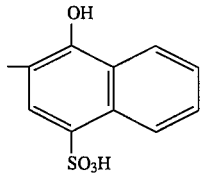
(2d)

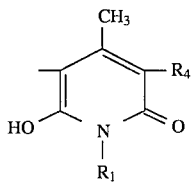 (2e)

or

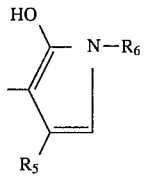 (2f)

(R)$_{0-3}$ are 0 to 3 substituents R from the group consisting of C$_{1-2}$alkyl, C$_{1-2}$alkoxy, hydroxy-C$_1$–C$_2$alkoxy, halogen, carboxyl, hydroxyl, amino, acetylamino, ureido or sulfo, R$_1$ is hydrogen or C$_{1-4}$alkyl, R$_2$ is hydrogen, C$_{1-4}$alkyl, C$_{1-4}$alkanoyl or C$_{1-4}$hydroxyalkyl, R$_3$ is hydrogen, C$_{1-4}$alkyl, C$_{1-4}$alkanoyl, benzoyl or aminobenzoyl and R$_4$ is —CONH$_2$ or —CH$_2$SO$_3$H, R$_5$ is C$_{1-3}$alkyl or carboxyl, R$_6$ is chloro- and/or sulfo-substituted phenyl or naphthyl, Z is as defined under formula (1) and the second sulfo group in formula (2c) is either in the 3 or 4 position.

Preferred dyes are also monoreactive disazo dyes of the formula

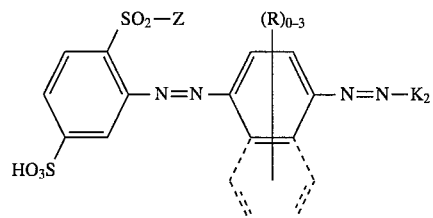 (3)

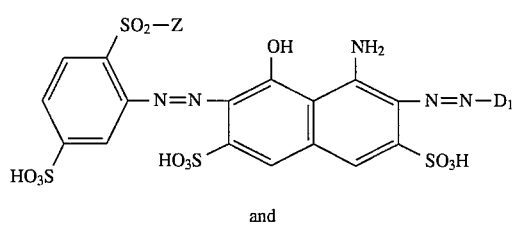 (4)

and

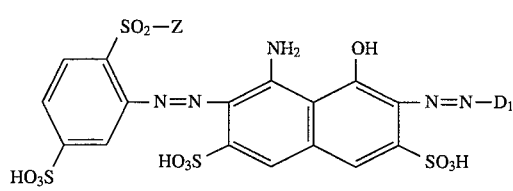 (5)

in which K$_2$ is a radical of formulae (2a) to (2f) or is

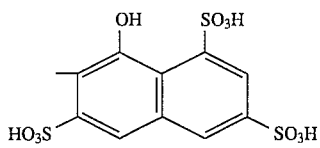 (3a)

D$_1$ is a radical of the formula

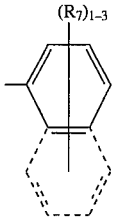 (4a)

or

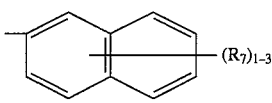 (4b)

in which (R$_7$)$_{1-3}$ are 1 to 3 substituents from the group consisting of C$_{1-2}$alkyl, C$_{1-2}$ alkoxy, halogen, carboxyl, hydroxyl, amino or sulfo and Z is as defined under formula (1) and (R)$_{0-3}$ are as defined under formula (2).

Preference is given to mono- and disazo monoreactive dyes of the formula (2) in which (R)$_{0-3}$ are methyl, ethyl, methoxy, ethoxy, hydroxyethoxy, hydroxyl, acetylamino, ureido or sulfo, R$_1$ is hydrogen, methyl or ethyl, R$_2$ is hydrogen, methyl, ethyl,

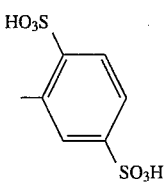

R$_3$ is hydrogen, benzoyl, aminobenzoyl or —COCH$_2$CH$_3$,

R$_4$ is —CONH$_2$ or —CH$_2$SO$_3$H,

R$_5$ is methyl or carboxyl

R$_6$ is 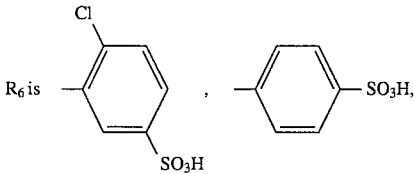

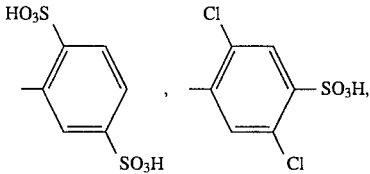

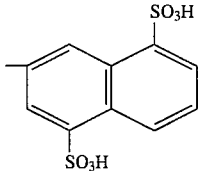

-continued $R_7$ is 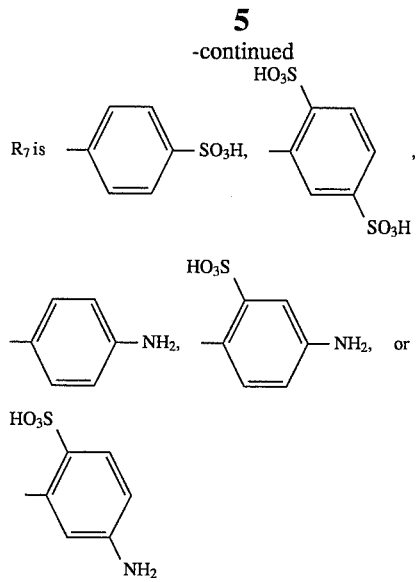

and

Z is β-sulfatoethyl.

Particular preference is given to compounds of the above-mentioned formula (3), in which Z is vinylsulfonyl or β-sulfatoethylsulfonyl, $(R)_{0-3}$ are 0–3, preferably 0–2 and particularly preferably 1 or 2, identical or different substituents from the group consisting of methyl, ethyl, methoxy, ethoxy, hydroxyethoxy, hydroxyl, acetylamino, ureido and sulfo, and $K_2$ is a radical of the formula

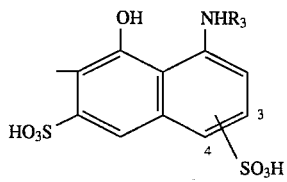 (2c)

or

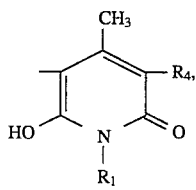 (2e)

in which $R_1$ is methyl or ethyl, $R_3$ is acetyl or benzoyl and $R_4$ is —CONH$_2$ or —CH$_2$SO$_3$H.

Likewise, preferred dyes are the monoazo bisreactive dyes of the formula

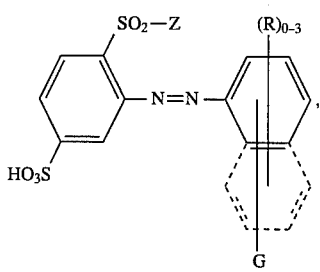 (6)

in which Z is as defined under formula (1) and $(R)_{0-3}$ are as defined under formula (2) and G is a $C_{1-4}$acylamino group substituted by 1 to 2 halogen atoms, for example a radical —NHCOCBr=CH$_2$ or —NHCOCHBr—CH$_2$Br, a radical —SO$_2$Z in which Z is as defined above or a radical of the formula

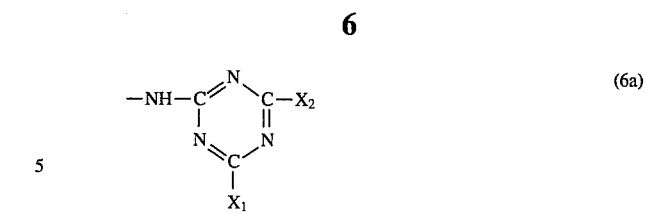 (6a)

in which $X_1$ is halogen and $X_2$ is halogen, carboxyl, sulfo, hyroxyl, $C_1$-$C_4$alkoxy or substituted or unsubstituted amino.

$X_2$ as substituted or unsubstituted amino, which is preferred, is particularly preferably amino, N-mono- or N,N-dimethylamino, N-mono- or N,N-diethylamino, N-methyl- or N-ethyl-N-phenylamino, morpholino, phenylamino which is unsubstituted or substituted by methyl, methoxy, chlorine or sulfo, or is a radical of the formula

—NH—(CH$_2$)$_{2-3}$—SO$_2$Z,

—NH—(CH$_2$)$_2$—O—(CH$_2$)$_2$—SO$_2$Z,

—NH—(CH$_2$)$_{2-3}$—NH—(CH$_2$)$_{2-3}$—SO$_2$Z,

—N[(CH$_2$)$_{2-3}$—SO$_2$Z]$_2$,

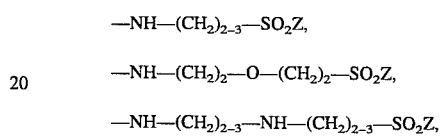

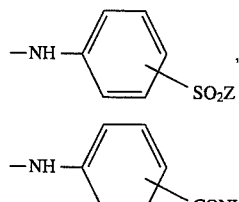

—NH—(CH$_2$)$_2$—O—(CH$_2$)$_2$—OH,

—NH—CH$_2$CH$_2$—OH or

—NH—CH$_2$CH$_2$SO$_3$H, in which Z is in each case as defined under formula (1).

Furthermore, preferred dyes are those of the formula

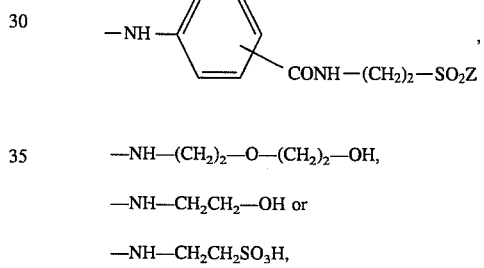 (7)

in which $K_3$ is the radical of 1-amino-8-hydroxynaphthalene-3,6-disulfonic acid 1-amino-8-hydroxynaphthalene-4,6-disulfonic acid or 3-amino-8-hydroxynaphthalene-6-sulfonic acid, in which each amino group is substituted by benzoyl, halogenated acyl groups or a substituted or unsubstituted triazine according to formula (6a), and Z is as defined under formula (1), or is the radical of 2-aminonaphthalene which is substituted in the 5 or 6 position by a radical —SO$_2$Z in which Z is as defined above.

Particular preference is given to compounds of the formula (7) in which Z is vinyl or β-sulfatoethyl and $K_3$ is 2-amino-6-vinyl- or 2-amino-6-β-sulfatoethylsulfonyl-1-naphthyl.

Particularly preferred dyes are those of the formula

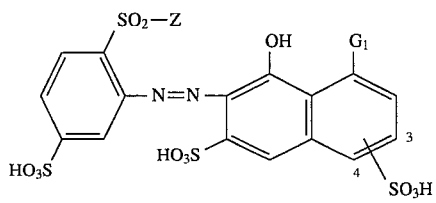

in which the second sulfo group in the naphthalene radical is either in the 3 or 4 position, $G_1$ is a radical of the formula

 (8a)

 (8b)

 (8c)

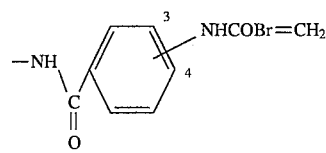 (8d)

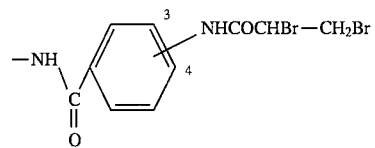 (8e)

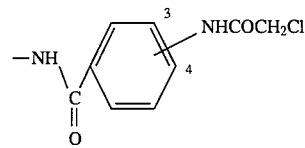 (8f)

or a radical of the formula (6a), the radicals of formulae (8a), (8b) and (8c) in formulae (8d), (8e) and (8f) being either in the 3 or 4 position, Z being as defined in formula (1) and $X_1$, $X_2$ being as defined in formula (6a), and of the formula

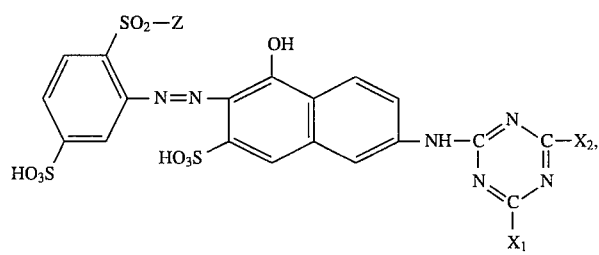 (9)

in which Z is as defined in formula (1) and $X_1$, $X_2$ are as defined in formula (6a).

Preferred dyes are also those of the formula

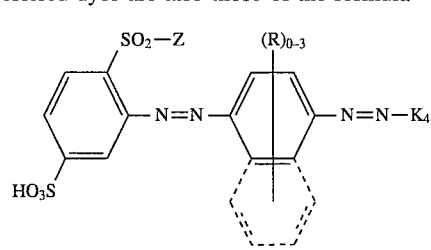 (10)

in which $K_4$ is a radical of the formula

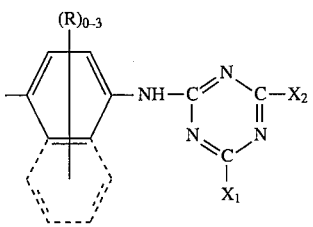 (10a)

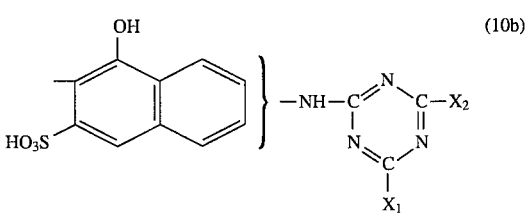 (10b)

or

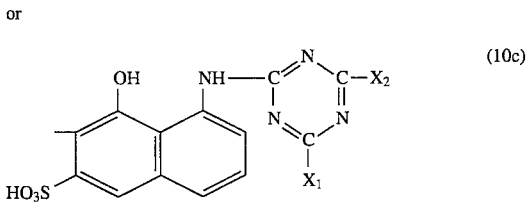 (10c)

in which Z is as defined in formula (1), $(R)_{0-3}$ are as defined under formula (2) and $X_1$, $X_2$ are as defined under formula (6a).

This invention furthermore relates to disazo bireactive dyes of the formula

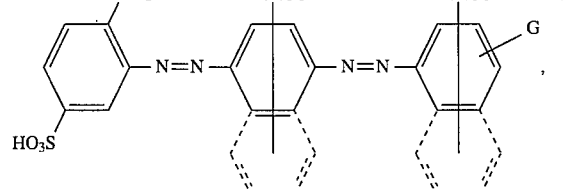 (11)

in which Z is as defined in formula (1), $(R)_{0-3}$ are as defined in formula (2) and G is as defined in formula (6), and to reactive dyes of the formula

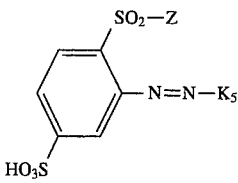

in which K₅ is the radical of 1-amino-8-hydroxynaphthalene-3,6-disulfonic acid,
1-amino-8-hydroxynaphthalene-3,5-disulfonic acid,
8-amino-1-hydroxynaphthalene-3,5(6)-disulfonic acid or
8-amino-1-hydroxynaphthalene-4,6-disulfonic acid which is coupled with a further radical of the formula

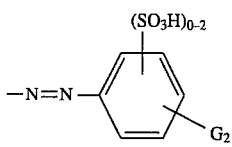

in which G₂ is a radical of the formula

| | |
|---|---|
| —SO₂—Z | (12b) |
| —SO₂—CH₂CH=CH₂ | (12c) |
| —NH—COCBr=CH₂ | (8b) |
| —CONH—(CH₂)₂—SO₂—Z | (12d) |
| —CONH—(CH₂)₂—O—(CH₂)₂—SO₂—Z | (12f) |
| —NHCOCH₂Cl | (8c) |
| —NHCOCHBr—CH₂Br | (8a) | or

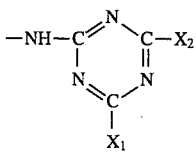

in which

Z is as defined in formula (1) and $X_1$, $X_2$ are as defined in formula (6a).

In what follows, possible starting materials which can be used for the preparation of the reactive dyes according to the invention will be mentioned.

Diazo Components

Aminobenzene, 1-amino-2-, -3- or 4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino- 3-methyl-6-methoxybenzene, 1-amino-2-methoxy-4-nitrobenzene, 4-aminobiphenyl, 1-aminobenzene-2-, -3- or -4-carboxylic acid, 2-aminodiphenyl ether, 1-aminobenzene-2-, -3- or -4-sulfonamide, 1-amino-N-methyl-, -N-ethyl-benzene-2-, -3- or -4-sulfonamide, -N,N-dimethyl- or -N,N-diethyl-1-aminobenzene-2-, -3- or -4-sulfonamide, dehydrothio-p-toluidinesulfonic acid, 1-amino-3-trifluoromethylbenzene-6-sulfonic acid, 1-amino-3- or -4-nitrobenzene, 1-amino-3- or -4-acetylaminobenzene, 1-aminobenzene-2-,-3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino- 2,5-dichlorobenzene-4-sulfonic acid, 1-amino-4-methyl-5-chlorobenzene-2-sulfonic acid, 1-amino-5-methyl-4-chlorobenzene-2 -sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxy- or -4-methylbenzene2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or 8-sulfonic acid, 1-aminonaphthalene -3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 4-(β-sulfatoethylsulfonyl)aniline, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5 -sulfonic acid, 1-hydroxy-2-amino-6-nitrobenzene-4-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8 -disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1,4-diaminobenzene-2,5-disulfonic acid, 1,4-diamino-benzene-2,6-disulfonic acid, 1,3-diaminobenzene-4,6-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6 -sulfonic acid, 1-amino-2-β-sulfoethyl-sulfonylbenzene-5-sulfonic acid.

In those cases in which the diazo component to be used is an aminoacetylamino compound from which the acetyl group is eliminated afterwards by hydrolysis instead of a diamine, the monoacetyl compounds of the abovementioned diazo components can be used, for example 1-acetylamino-3-aminobenzene-4-sulfonic acid or 1-acetylamino-4-aminobenzene-3-sulfonic acid.

Coupling Components

Phenol, 1-hydroxy-3-or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4, 6-or -4,7-disulfonic acid, 1-amino-3-methylbenzene, 1-amino-2-methoxy-5 -methylbenzene, 1-amino-2,5-dimethylbenzene, 3-aminophenylurea, 1-amino-3-acetylaminobenzene, 1-amino-3-hydroxyacetylaminobenzene, 1,3-diamino-benzene-4-sulfonic acid, 1-aminonaphthalene-6- or -8-sulfonic acid, 1-amino-2-methoxy-naphthalene-6-sulfonic acid, 2-aminonaphthalene-5,7-disulfonic acid, 1-amino-8-hydroxy-naphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetyl-aminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7 -sulfonic acid, 2-acetylamino-5-hydroxy-naphthalene-7-sulfonic acid, 2-amino-5-hydroxynaphthalene- 1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, -(4'-aminobenzoylamino)-8-hydroxynaphthalene-3,6- or -4,6-disulfonic acid, 1-(4'-nitrobenzoylamino) -8-hydroxynaphthalene-3,6- or-4,6-disulfonic acid, 1-(3'-aminobenzoylamino) -8-hydroxynaphthalene-3,6- or -4,6-disulfonic acid, 1-(3'-nitrobenzoylamino)-8-hydroxynaphthalene-3,6 -or-4,6-disulfonic acid, 2-(4'-aminosulfophenylamino)-5-hydroxynaphthalene-7-sulfonic acid, 3-methyl-5-pyrazolone, 1-phenyl-3-methyl-5-pyrazolone, 1-(4'-sulfophenyl)-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5 -pyrazolone, 1-(2'-methyl-4'-sulfophenyl)-5-pyrazolone-3-carboxylic acid, 1-(4', 8'-disulfo-2'-naphthyl-3-methyl-5-pyrazolone, 1-(5',7'-disulfo-2'-naphthyl-3-methyl-5-pyrazolone, 1-(2',5'-dichloro-4'-sulfophenyl)-3-methyl-5-pyrazolone, 3-aminocarbonyl-4-methyl-6-hydroxy-2-pyridone-, 1-ethyl-3-cyano- or-3-chloro-4-methyl-6-hydroxy-2-pyridone, 1-ethyl-3-sulfomethyl-4 -methyl-6-hydroxy-2-pyridone, 1-ethyl-3-carbamoyl-4-methyl-6-hydroxy-2-pyridone, 1-ethyl-3-sulfomethyl-4-methyl-5-carbamoyl-6-hydroxy-2-pyridone, N-acetoacetylaminobenzene, 1-(N-acetoacetylamino)-2-methoxybenzene-5-sulfonic acid, 4-hydroxy-2-quinolone, 1-amino-8-hydroxy-2-(phenylazo)naphthalene-3,6-disulfonic acid, 1-amino-8-hydroxy-2-(4'-sulfophenylazo)naphthalene-3,6-disulfonic acid, 1-amino-8-hydroxy-2-(2',5'-disulfophenylazo)naphthalene-3,6-disulfonic acid, 1-β-aminoethyl-3-cyano-4-methyl-6-hydroxy-2-pyridone, 1-γ-aminopropyl-3-sulfomethyl-4,6 -methyl-6-hydroxy-2-pyridone, 1,3-diaminobenzene, 1-amino-3-(N,N-di-β-hydroxyethyl)aminobenzene, 1-amino-3-(N,N-di-β-sulfatoethyl)aminobenzene, 1-amino-3-(N,N- di-β-hydroxyethyl)amino-4-methoxybenzene, 1-amino-3-(N,N-di-β-sulfatoethyl)amino-4-methoxybenzene, 1-amino-3-sulfobenzylaminobenzene, 1-amino-3-sulfobenzylamino-4-chlo 1-amino-3-(N,N-di-sulfobenzyl)aminobenzene.

Triazines 2,4,6-trifluoro-s-triazine (cyanuric fluoride), 2,4,6-trichloro-s-triazine (cyanuric chloride), 2,4,6-tribromo-s-triazine (cyanuric bromide), 2,4,6-trisulfo-s-triazine, 2,4,6-tris(methylsulfonyl)-s-triazine, 2,4,6-tris(phenylsulfonyl)-s-triazine.

Diamines

4-Aminomethyl-3-sulfoaniline, 4- aminomethyl-2-sulfoanilne, 4-(β-aminoethoxy)-3-sulfoaniline.

Amines

Ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, phenethylamine, cyclohexylamine, N-propylaminobenzene, N-isopropylaminobenzene, N-butylaminobenzene, N-isobutylaminobenzene, N-sec-butylaminobenzene, N-hexylaminobenzene, N-β-hydroxyethylaminobenzene, N-β-chloroethylaminobenzene, N-β-cyanoethylaminobenzene, N-β-sulfoethylaminobenzene, 1-(N-ethylamino)-2-,3- or -4-methylbenzene, 1-(N-ethylamino)-2-, -3-or -4-ethylbenzene, 1-(N-ethylamino)-2-, -3- or -4-chlorobenzene, 1-N-ethylaminobenzene-3- or -4-sulfonic acid, 1-(N-ethylamino)-4-butylbenzene, 1-(N-ethylamino)-4-hexylbenzene, 1-(N-ethylamino)-4-octylbenzene, 1-(N-ethylamino)-4-vinylbenzene, 1-N-n-butylamino-3-methylbenzene, 1-(N-ethylamino)-4-fluorobenzene, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, 2,5-dimethoxyaniline, o-, m- and p-anisidine, o-, m- and p-phenetidine, 2-methoxy-5-methylaniline, 2-ethoxy-5-methoxyaniline, 4-bromoaniline, 3-aminobenzamide, 4-aminophenylsulfamide, 3-trifluoromethylaniline, 3- and 4-aminophenylsulfamide, 3-trifluoromethylaniline, 3- and 4-aminophenylurea, 1-naphthylamine, 2-naphthylamine, orthanilic acid, metanilic acid, sulfanilic acid, aniline-2,4-disulfonic acid, aniline-2,5-disulfonic acid, aniline-3,5-disulfonic acid, anthranilic acid, m- and p-aminobenzoic acid, 4-aminophenylmethanesulfonic acid, aniline-N-methanesulfonic acid, 2-aminotoluene4-sulfonic acid, 2-aminotoluene-5-sulfonic acid, p-aminosalicylic acid, 1-amino-4-carboxybenzene-2-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine -2,4-, -2,5-, -2,7-, -2,8-, -3,5-, -3,6-, -3,7-, -3,8-, -4,6-, -4,7-, -4,8- and-5,8-disulfonic acid, 2-naphthylamine- 1,5-, -1,6-, -1,7-, -3,6-, -3,7-, -4,7-, -4,8-, -5,7- and -6,8 -disulfonic acid, 1-naphthylamine-2,4,6-, -2,4,7-, -2,5, 7-, -3,5,7-, -3,6,8- and -4,6,8-trisulfonic acid, 2-naphthylamine-1,3,7-, -1,5,7-, -3,5,7-, -3,6,7-, -3,6,8- and 4,6,8-trisulfonic acid, 2-, 3- and 4-aminopyridine, 2-aminobenzothiazole, 5-, 6- and 8-aminoquinoline, 2-aminopyrimidine, morpholine, piperidine, piperazine.

The process for the preparation of the reactive dyes of the formula (1) comprises diazotising diazo components of the formula,

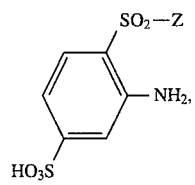

in which Z is as defined under formula (1) and coupling the product onto one of the coupling components K and, if desired, carrying out a further conversion reaction, for example again diazotising the intermediate formed after coupling and coupling the product onto a further coupling component from the defined group K and, if desired, further reacting the product or coupling the intermediate onto a further diazo component.

In general, the reaction is carried out stepwise in succession; coupling onto the middle component in the ortho-position relative to the $NH_2$ group in acidic solution must be carried out first because coupling in the ortho position relative to the OH in neutral or alkaline solution, for example in the case of coupling component K5 in formula (12), if carried out first, could not be followed by coupling in the ortho position relative to the amino group.

Another method is to fast prepare a dye containing a precursor of the reactive radical and converting this precursor afterwards into the end product stage, for example by esterification or an addition reaction.

Moreover, the synthesis can be followed by elimination reactions. For example, reactive dyes of the formula (1) containing sulfatoethylsulfonyl radicals can be treated with dehydrohalogenating agents, such as sodium hydroxide, which convert the sulfatoethylsulfonyl radicals into vinylsulfonyl radicals.

In principle, reactive dyes of the formula (1) of all classes of dyes can be prepared in a manner known per se or analogously to known procedures by starting from precursors or intermediates for dyes containing fibre-reactive radicals according to formula (1a) or by introducing these fibre-reactive radicals into intermediates of dye character suitable for this purpose.

The reactive dyes of the formula (1) are suitable for the dyeing and printing of a wide range of materials, such as silk, leather, wool, polyamide fibres and polyurethanes, and in particular cellulose-containing fibre materials of any kind. Examples of such fibre materials are natural cellulose fibres, such as cotton, linen and hemp, cellulose itself and regenerated cellulose. The reactive dyes of the formula (1) are also suitable for the dyeing or printing of hydroxyl-containing fibres present in blended fabrics, for example of cotton blends with polyester fibres or polyamide fibres.

The dyes according to the invention can be applied to the fibre material in various ways and fixed on the fibre, in particular in the form of aqueous dye solutions and printing pastes. They are not only suitable for the exhaust method but also for dyeing by the padding method and can be used at low dyeing temperatures and require only short steaming times in the pad steam process. The degrees of fixation are high, and the unfixed dye can be easily washed off, the difference between degree of exhaustion and degree of fixation being remarkably small, i.e. the soaping loss being very low. The reactive dyes of the formula (1) are also suitable for printing, in particular on cotton, but also for the printing of nitrogen-containing fibres, for example of wool, silk or wool-containing blended fabrics.

The dyeings and prints obtained with the dyes according to the invention on cellulose fibre materials have a high colour strength and a high stability of the fibre-to-dye bond, not only in the acidic but also in the alkaline range, furthermore good lightfastness and very good wetfastness properties, such as wash, water, seawater, cross-dyeing and perspiration fastness properties, and good pleating fastness, hotpress fastness, rubfastness and in particular chlorine fastness.

The examples which follow serve to illustrate the invention. Temperatures are given in degrees centigrade, parts and percentages are by weight, unless stated otherwise. Pans by weight relate to parts by volume as the kilogram relates to the liter.

The most important process variants are described in the exemplary embodiments.

EXAMPLE 1

A solution of 21.7 g of 2-β-sulfatoethylsulfonyl-5-sulfoaniline in 270 ml of water was diazotised using 30 ml of 5N hydrochloric acid and 15 ml of 3.33N $NaNO_2$ solution at 0° to 5° C., and a neutral aqueous solution of 14.2 g of 1-(4-sulfophenyl)-3-carboxy-5-pyrazolone was added. By strewing in sodium bicarbonate, the pH was brought to a value of 5 to 6. After coupling was complete, the dye was salted out with potassium chloride and subjected to gentle drying under reduced pressure. It has the formula

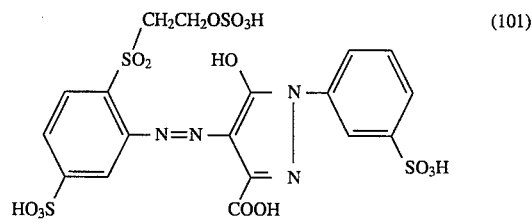

(101)

and dyes cotton in lightfast yellow hues.

EXAMPLE 2

An aqueous suspension of 31.9 parts of 1-amino-3,6-disulfo-8-naphthol is introduced at 5° C. into an aqueous hydrochloric acid solution of the diazonium salt obtained from 37 parts of 2-β-sulfatoethylsulfonyl-5-sulfoaniline, and the coupling reaction is carried out at a pH of between 1 and 2. An aqueous hydrochloric acid suspension of the diazonium salt of a condensation product obtained by reaction of 18.8 parts of 4-sulfo-1,3-phenylenediamine with 18.4 parts of cyanuric chloride at a pH of 2.5 and a temperature of 10° C. is then added. The second coupling reaction is carried out at a pH of between 5 and 6. A solution of 18 parts of 3-sulfoaniline is then added, and the condensation reaction is brought to completion at a pH of between 7 and 9 and a temperature of 20° to 30° C. The batch is then allowed to cool, made neutral, and the resulting azo compound according to the invention is salted out with sodium chloride and isolated in the usual manner.

This gives a black, electrolyte-containing powder of the compound of the formula

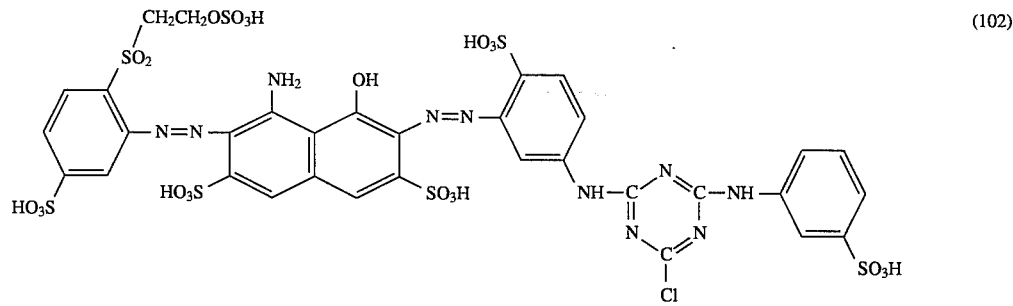

(102)

which exhibits very good fibre-reactive dye properties and dyes, for example, cotton by the dyeing and printing processes customary for fibre-reactive dyes in navy hues having good fastness properties.

EXAMPLE 3

95 parts of cyanuric chloride are reacted in a known manner with 1-amino-8-hydroxynaphthalene-3,6-disulfonic acid in water. A freshly diazotised equivalent solution of 2-β-sulfatoethylsulfonyl-5-sulfoaniline is added to this product, and the pH is brought to a value of 4 to 4.5. After coupling is complete, 1 part of 1-amino-4-β-(β'-chloroethylsulfonyl)ethylaminocarbonylbenzene hydrochloride is added and made to react at a pH of 7 to 7.5 and 35° C. Salting out with KCl gives the dye of the formula

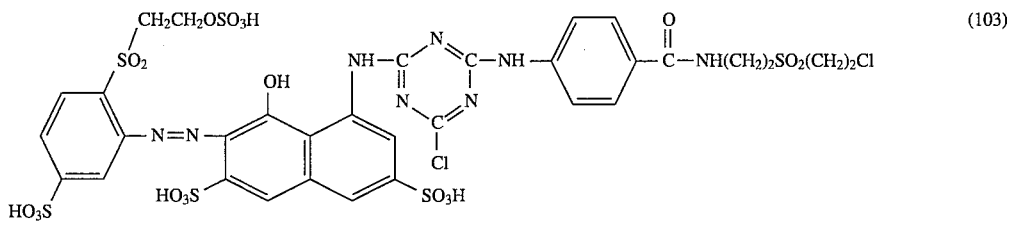

(103)

which dyes cotton in bright red shades having good fastness properties.

EXAMPLE 4

16 parts of 1-amino-8-hydroxynaphthalene-3,6-disulfonic acid are dissolved in 400 parts of water under neutral conditions. The reaction solution is brought to a pH of 4.5, and 7.0 parts of cyanuric fluoride are added dropwise at 0° to 3° C. with thorough stirring. The hydrogen fluoride released during this addition is neutralised by metered addition of 2N sodium hydroxide solution. When free 1-amino-8-hydroxynaphthalene-3,6-disulfonic acid can no longer be detected, 17 parts of 1-amino-3-β'-(β'-chloroethylsulfonyl)ethylaminocarbonylbenzene hydrochloride in 50 parts of water are added. The temperature is allowed to rise to 20° to 25° C. while maintaining the pH of the reaction solution at 4 to 4.5. After condensation is complete, the dye intermediate is coupled at 0° to 10° C. onto 18 parts of diazotised 2-β-sulfatoethylsulfonyl-5-sulfoaniline. At a final pH of 6.5 to 7, the dye of the formula

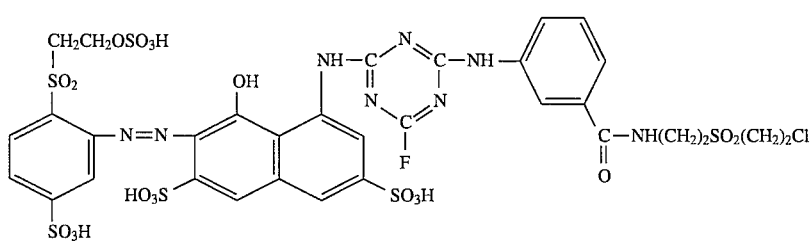

(104)

is salted out with sodium chloride, filtered, washed and dried in vacuo. It is a dark red powder and dyes cotton and regenerated cellulose in bluish red hues having good pad, rub and lightfastness properties.

EXAMPLE 5

An aqueous solution of 22 parts of 1-naphthylamino-6-sulfonic acid is added at 0° to 5° C. to an aqueous hydrochloric acid solution of the diazonium salt obtained from 37 parts of 2-β-sulfatoethylsulfonyl-5-sulfoaniline, and the coupling reaction is carried out at a pH of between 2 and 3. The intermediate obtained of the formula

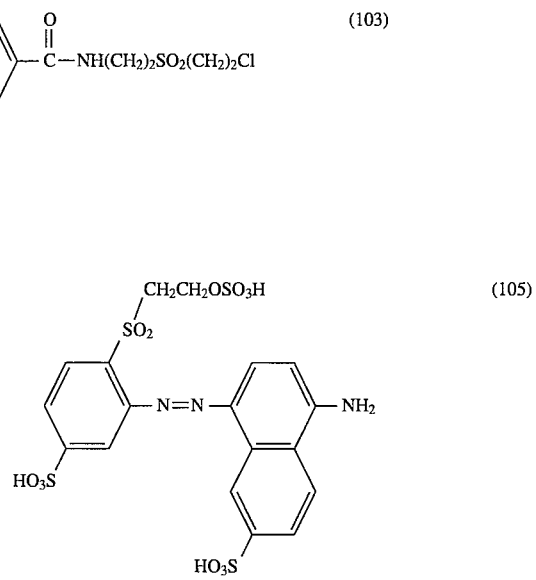

(105)

is diazotised in the usual manner, and the product is coupled onto 3-acetylaminoaniline at a pH of 5 to 7 and a temperature of between 0° and 10° C. The compound thus formed of the formula

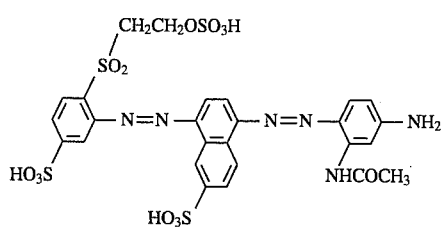
(105a)
is condensed with dibromopropionyl chloride at 0° to 20° C. and a pH of between 5 and 8.
The dye obtained of the formula
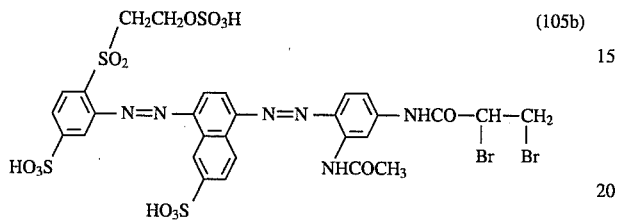
(105b)
is salted out with potassium chloride and subjected to gentle drying. It dyes cotton in brown hues having good fastness properties.
Further dyes according to the invention listed in the tables below can be prepared analogously to these examples.

| No. | Formula | |
|---|---|---|
| (106) | CH₂CH₂OSO₃H–SO₂–[2-substituted-5-sulfophenyl]–N=N–[pyridone with CH₃, CONH₂, HO, N–C₂H₅, =O] | YELLOW |
| (107) | CH₂CH₂OSO₃H–SO₂–[2-substituted-5-sulfophenyl]–N=N–[pyridone with CH₃, CH₂SO₃H, HO, N–C₂H₅, =O] | YELLOW |
| (108) | CH₂CH₂OSO₃H–SO₂–[2-substituted-5-sulfophenyl]–N=N–[central C with HO, CH₃]–N=N–[2-chloro-5-sulfophenyl] | YELLOW |
| (109) | CH₂CH₂OSO₃H–SO₂–[2-substituted-5-sulfophenyl]–N=N–[central C with HO, CH₃]–N=N–[2,5-dichloro-4-sulfophenyl] | YELLOW |

-continued

| No. | Formula | |
|---|---|---|
| (110) | [structure] | YELLOW |
| (111) | [structure] | YELLOW |
| (112) | [structure] | YELLOW |
| (113) | [structure] | YELLOW |

-continued

| No. | Formula | |
|---|---|---|
| (114) | Structure with CH₂CH₂OSO₃H, SO₂, N=N, naphthalene with OH, HO₃S, NHCOCBr=CH₂, and phenyl-SO₃H | ORANGE |
| (115) | Structure with CH₂CH₂OSO₃H, SO₂, N=N, naphthalene with OH, HO₃S, NHCOCHBr—CH₂Br, SO₃H, and phenyl-SO₃H | RED |
| (116) | Structure with CH₂CH₂OSO₃H, SO₂, N=N, naphthalene with OH, HO₃S, NHCOCHBr—CH₂Br, SO₃H, and phenyl-SO₃H | RED |
| (117) | Structure with CH₂CH₂OSO₃H, SO₂, N=N, naphthalene with OH, HO₃S, N(CH₃)COCBr=CH₂, and phenyl-SO₃H | ORANGE |

-continued

| No. | Formula | |
|---|---|---|
| (118) | [structure with CH₂CH₂OSO₃H, SO₂, HO₃S, N=N, HO, NHCO, SO₃H, NHCOCHBr—CH₂Br] | RED |
| (119) | [structure with CH₂CH₂OSO₃H, SO₂, HO₃S, N=N, HO, NHCO-phenyl, SO₃H] | RED |
| (120) | [structure with CH₂CH₂OSO₃H, SO₂, HO₃S, N=N, HO, naphthyl, SO₃H] | ORANGE |
| (121) | [structure with CH₂CH₂OSO₃H, SO₂, HO₃S, N=N, HO, NHCOCH₂CH₃, SO₃H] | RED |

-continued

| No. | Formula | |
|---|---|---|
| (122) | naphthalene structure with NHCO-phenyl, SO₃H, OH, N=N-phenyl(SO₂CH₂CH₂OSO₃H, HO₃S) | RED |
| (123) | naphthalene structure with NH-phenyl(HO₃S, SO₃H), OH, N=N-phenyl(SO₂CH₂CH₂OSO₃H, HO₃S) | SCARLET |
| (124) | phenyl(SO₂CH₂CH₂OSO₃H, HO₃S)-N=N-phenyl(NHCOCH₃, NHCOCH₃) | YELLOW |
| (125) | phenyl(SO₂CH₂CH₂OSO₃H, HO₃S)-N=N-phenyl(NHCOCH₃) | YELLOW |
| (126) | phenyl(SO₂CH₂CH₂OSO₃H, HO₃S)-N=N-phenyl(NHCOCH₃, NHCONH₂) | YELLOW |

-continued

| No. | Formula | |
|---|---|---|
| (127) | [structure: benzene with SO$_2$CH$_2$CH$_2$OSO$_3$H, HO$_3$S, N=N linked to benzene with OCH$_3$, NHCOCH$_3$, CH$_3$] | YELLOW |
| (128) | [structure: benzene with SO$_2$CH$_2$CH$_2$OSO$_3$H, HO$_3$S, N=N-benzene-N=N-benzene-NHCOCH$_3$] | YELLOW |
| (129) | [structure: benzene with SO$_2$CH$_2$CH$_2$OSO$_3$H, HO$_3$S, N=N linked to dimethylbenzene then to naphthalene with SO$_3$H and NH-triazine (NH$_2$, Cl)] | ORANGE |
| (130) | [structure: benzene with SO$_2$CH$_2$CH$_2$OSO$_3$H, HO$_3$S, N=N linked to naphthalene with SO$_3$H, NH-triazine (NH$_2$, Cl), and additional SO$_3$H-naphthalene] | BROWN |

| No. | Formula | |
|---|---|---|
| (131) | *[chemical structure: disazo dye with naphthalene cores, SO₂CH₂CH₂OSO₃H, HO₃S groups, and chlorotriazine with N(CH₃)CH₂CH₂OH substituent]* | BROWN |
| (132) | *[chemical structure: disazo dye with naphthalene cores, NHCOCH₃, SO₂CH₂CH₂OSO₃H, and HO₃S substituents]* | BROWN |
| (133) | *[chemical structure: disazo dye with naphthalene bearing NHCOCH₃, phenyl with OCH₃ and CH₃, SO₂CH₂CH₂OSO₃H, HO₃S groups]* | BROWN |
| (134) | *[chemical structure: copper complex azo dye with naphthalene bearing two SO₃H groups, OH-Cu-OH chelation, phenyl with SO₂CH₂CH₂OSO₃H and HO₃S]* | BLUE |

-continued

| No. | Formula | |
|---|---|---|
| (135) | [chemical structure] | NAVY |
| (136) | [chemical structure] | BROWN |
| (137) | [chemical structure] | NAVY |
| (138) | [chemical structure] | NAVY |

-continued

| No. | Formula | |
|---|---|---|
| (139) | [structure] | NAVY |
| (140) | [structure] | NAVY |
| (141) | [structure] | NAVY |
| (142) | [structure] | NAVY |

-continued

| No. | Formula | |
|---|---|---|
| (143) | [structure] | NAVY |
| (144) | [structure] | RED |
| (145) | [structure] | RED |
| (146) | [structure] | RED |

-continued

| No. | Formula | |
|---|---|---|
| (147) | | RED |
| (148) | | RED |
| (149) | | ORANGE |
| (150) | | ORANGE |

| No. | Formula | |
|---|---|---|
| (151) | [structure] | ORANGE |
| (152) | [structure] | ORANGE |
| (153) | [structure] | YELLOW |
| (154) | [structure] | YELLOW |

-continued

| No. | Formula | |
|---|---|---|
| (155) | [structure] | YELLOW |
| (156) | [structure] | YELLOW |
| (157) | [structure] | YELLOW |
| (158) | [structure] | YELLOW |

-continued

| No. | Formula | |
|---|---|---|
| (159) | [chemical structure] | RED |
| (160) | [chemical structure] | NAVY |
| (161) | [chemical structure] | NAVY |
| (162) | [chemical structure] | NAVY |

-continued

| No. | Formula | |
|---|---|---|
| (163) | [structure] | NAVY |
| (164) | [structure] | NAVY |
| (165) | [structure] | NAVY |
| (166) | [structure] | BLUE |

-continued

| No. | Formula | |
|---|---|---|
| (167) | (structure) | BROWN |
| (168) | (structure) | YELLOW |
| (169) | (structure) | BROWN |
| (170) | (structure) | BROWN |

-continued

| No. | Formula | |
|---|---|---|
| (171) | | NAVY |
| (172) | | NAVY |
| (173) | | NAVY |

| No. | Formula | |
|---|---|---|
| (174) | [chemical structure: naphthalene core with OH, H₂N, HO₃C substituents; azo-linked to benzene with SO₂CH₂CH₂OSO₃H and HO₃S; other azo link to benzene with HO₃S, SO₃H, NH-triazine(Cl)(NH-C(=O)-NHCH₂CH₂OH)] | NAVY |
| (175) | [chemical structure: naphthalene core with NH₂, HO, HO₃C; azo-linked to benzene with SO₂CH₂CH₂OSO₃H and HO₃S; other azo link to benzene with HO₃S, SO₃H, NH-triazine(Cl)-NH-phenyl-SO₃H] | NAVY |
| (176) | [chemical structure: naphthalene core with NH₂, HO, HO₃C; azo-linked to benzene with SO₂CH₂CH₂OSO₃H and HO₃S; other azo link to benzene with HO₃S, SO₃H, NH-triazine(Cl)-HN-phenyl(HO₃S)-NH-triazine, linked to naphthyl-SO₃H] | NAVY |

-continued

| No. | Formula | |
|---|---|---|
| (177) | | NAVY |
| (178) | | NAVY |
| (179) | | NAVY |
| (180) | | NAVY |

-continued

| No. | Formula | |
|---|---|---|
| (181) | (structure) | NAVY |
| (182) | (structure) | NAVY |
| (183) | (structure) | NAVY |
| (184) | (structure) | NAVY |

| No. | Formula | |
|---|---|---|
| (185) | | BLUE |
| (186) | | BROWN |
| (187) | | YELLOW |
| (188) | | BROWN |

-continued

| No. | Formula | |
|---|---|---|
| (189) | [structure] | BROWN |
| (190) | [structure] | BROWN |
| (191) | [structure] | NAVY |
| (192) | [structure] | NAVY |

-continued

| No. | Formula | |
|---|---|---|
| (193) | [structure] | NAVY |
| (194) | [structure] | NAVY |
| (195) | [structure] | BROWN |
| (196) | [structure] | BROWN |

-continued

| No. | Formula | |
|---|---|---|
| (197) | | BLUE |
| (198) | | NAVY |
| (199) | | NAVY |
| (200) | | NAVY |

-continued

| No. | Formula | |
|---|---|---|
| (201) | [structure with CH₂CH₂OSO₃H-SO₂- group, naphthalene core with H₂N, OH, SO₃H, and azo linkages to phenyl groups bearing HO₃S, SO₃H, and NHCOCBr=CH₂] | NAVY |
| (202) | [structure with CH₂CH₂OSO₃H-SO₂- group, naphthalene core with H₂N, OH, SO₃H, and azo linkages to phenyl groups bearing HO₃S, SO₃H, and NHCOCBr=CH₂] | NAVY |
| (203) | [structure with CH₂CH₂OSO₃H-SO₂- group, naphthalene core with H₂N, OH, SO₃H, and azo linkages to phenyl groups bearing HO₃S, SO₃H, and NHCOCHBr—CH₂Br] | NAVY |
| (204) | [structure with CH₂CH₂OSO₃H-SO₂- group, naphthalene core with H₂N, OH, SO₃H, and azo linkages to phenyl groups bearing HO₃S, SO₃H, and CONH—(CH₂)₂—SO₂—(CH₂)₂—OSO₃H] | NAVY |

-continued

| No. | Formula | |
|---|---|---|
| (205) | [structure: 2,5-disubstituted benzene with SO₂—CH₂CH₂—O—SO₃H and N=N linked to phenyl bearing N(C₂H₅)₂ and NHCOCH₃, with SO₃H] | RED |
| (206) | [structure: similar to (205) with SO₂—CH₂CH₂—O—SO₃H, N=N, N(C₂H₅)₂, NHCOCHBr—CH₂Br, SO₃H] | RED |
| (207) | [structure: SO₂CH=CH₂, N=N, N(CH₂CH₂OH)₂, NHCOCBr=CH₂, SO₃H] | RED |
| (208) | [structure: disazo naphthalene with NHPh, SO₃H, SO₂CH₂CH₂—OSO₃H, SO₃H] | NAVY |
| (209) | [structure: trisazo with NHCOCBr=CH₂, HO₃S, HO₃S, SO₂CH₂CH₂OSO₃H] | BROWN |

| No. | Formula | | |
|---|---|---|---|
| (210) | [structure with naphthalene core, azo linkages, N(CH₂CH₂OH)₂ group, SO₂CH₂CH₂OSO₃H, SO₃H groups] | BORDEAUX | |
| (211) | [structure with naphthalene core, azo linkages, N(C₂H₅)₂ group, NHCOCHBr—CH₂Br, SO₂CH₂CH₂—O—SO₃H, SO₃H groups] | VIOLET | |
| (212) | [structure with azo linkage, NHCOCBr=CH₂, NHCOCH₃, SO₂CH₂CH₂OSO₃H, HO₃S groups] | YELLOW | |
| (213) | [structure with azo linkage, NHCOCBr=CH₂, SO₂CH₂CH₂OSO₃H, HO₃S groups] | YELLOW | |

-continued

| No. | Formula | |
|---|---|---|
| (214) | [structure with CH₂CH₂OSO₃H, SO₂, N=N, OCH₃, CH₃, N=N, HO, NHCOCBr=CH₂, SO₃H, HO₃S, HO₃S] | NAVY |
| (215) | [structure with SO₂CH₂CH₂OSO₃H, N=N, CH₃, CH₃, N=N, NHCOCBr=CH₂, SO₃H, HO₃S] | BROWN |
| (216) | [structure with SO₂CH₂CH₂OSO₃H, N=N, NHCOBr=CH₂, NHCONH₂, HO₃S] | YELLOW |
| (217) | [structure with SO₂CH₂CH₂OSO₃H, N=N, OCH₃, NHCOCBr=CH₂, CH₃, HO₃S] | YELLOW |
| (218) | [structure with SO₂CH₂CH₂OSO₃H, N=N, N=N, NHCOCBr=CH₂, HO₃S] | YELLOW |

-continued

| No. | Formula | |
|---|---|---|
| (219) | [structure with CH₂CH₂OSO₃H, SO₂, OCH₃, CH₃, NHCOCBr=CH₂, HO₃S, HO₃S groups] | BROWN |
| (220) | [structure with HO₃SO(H₂C)₂O₂S, HO₃S, H₂N, SO₂(CH₂)₂OSO₃H groups] | YELLOW |
| (221) | [structure with SO₂CH₂CH₂OSO₃H, OCH₃, CH₃, CH₂SO₃H, CH₃, N—C₂H₅, HO, HO₃S groups] | SCARLET |
| (222) | [structure with SO₂CH₂CH₂OSO₃H, OCH₃, CH₃, CONH₂, CH₃, N—C₂H₅, HO, HO₃S groups] | SCARLET |

-continued

| No. | Formula | |
|---|---|---|
| (223) | (structure with SO₂CH₂CH₂OSO₃H, NHCOCHBrCH₂Br, NHCONH₂, HO₃S groups) | YELLOW |
| (224) | (pyridone azo structure with CONH₂, CH₃, N-C₂H₅, OH, OCH₂CH₂OH, CH₃, HO₃SOCH₂CH₂O₂S, HO₃S) | SCARLET |
| (225) | (pyridone azo structure with CH₂SO₃H, CH₃, N-C₂H₅, OH, OCH₂CH₂OH, CH₃, HO₃SOCH₂CH₂O₂S, HO₃S) | SCARLET |
| (226) | (structure with CH₃, CH₃, CH₃, N-CH₂CH₃, C=O, CH₂CH₂SO₃H, SO₂CH₂CH₂OSO₃H, HO₃S) | BROWN |
| (227) | (naphthalene azo structure with HN-CO-phenyl, SO₃H, OH, HO₃S, OCH₃, NHCOCH₃, HO₃SOCH₂CH₂O₂S, HO₃S) | NAVY |

| No. | Formula | |
|---|---|---|
| (228) | | SCARLET |
| (229) | | NAVY |
| (230) | | NAVY |
| (231) | | ORANGE |

| No. | Formula | |
|---|---|---|
| (232) | | BROWN |
| (233) | | BROWN |
| (234) | | BROWN |

-continued

| No. | Formula | |
|---|---|---|
| (235) | | BROWN |
| (236) | | NAVY |
| (237) | | NAVY |

-continued

| No. | Formula | |
|---|---|---|
| (238) | [structure] | BROWN |
| (239) | [structure] | SCARLET |
| (240) | [structure] | SCARLET |
| (241) | [structure] | YELLOW |

| No. | Formula | |
|---|---|---|
| (242) | (structure) | YELLOW |
| (243) | (structure) | NAVY |
| (244) | (structure) | NAVY |
| (245) | (structure) | NAVY |

-continued

| No. | Formula | |
|---|---|---|
| (246) | | BROWN |
| (247) | | BROWN |

Dyeing Procedure I 2 parts of the dye obtained according to Example 1 are dissolved in 400 parts of water, 1500 parts of a solution containing 53 g of sodium chloride per liter are added to this solution. This dyebath is entered at 40° C. with 100 parts of cotton fabric. After 45 minutes, 100 parts of a solution containing 16 g of sodium hydroxide and 20 g of calcined sodium carbonate per liter are added. The temperature of the dyebath is maintained at 40° C. for another 45 minutes. The dyed material is then rinsed, soaped at the boil with a nonionic detergent for quarter of an hour, rinsed again and dried.

Dyeing Procedure II 2 parts of the reactive dye obtained according to Example 1 are dissolved in 400 parts of water, 1500 parts of a solution containing 53 g of sodium chloride per liter are added to this solution. This dyebath is entered at 35° C. with 100 parts of cotton fabric. After 20 minutes, 100 parts of a solution containing 16 g of sodium hydroxide and 20 g of calcined sodium carbonate per liter are added. The temperature of the dyebath is maintained at 35° C. for another 15 minutes. The temperature is then increased to 60° C. over a period of 20 minutes. The temperature is maintained at 60° C. for another 35 minutes. The dyed material is then rinsed, soaped at the boil with a nonionic detergent for quarter of an hour, rinsed again and dried.

Dyeing Procedure III 8 parts of the reactive dye obtained according to Example 1 are dissolved in 400 parts of water; 1400 parts of a solution containing 100 g of sodium sulfate per liter are added to this solution. This dyebath is entered at 25° C. with 100 parts of cotton fabric. After 10 minutes, 200 parts of a solution containing 150 g of trisodium phosphate per liter are added. The temperature of the dyebath is then increased to 60° C. over a period of 10 minutes. The temperature is maintained at 60° C. for another 90 minutes. The dye material is then rinsed, soaped at the boil with a nonionic detergent for quarter of an hour, rinsed again and dried.

Dyeing Procedure IV 4 parts of the reactive dye obtained according to Example 1 are dissolved in 50 parts of water. 50 parts of a solution containing 5 g of sodium hydroxide and 20 g of calcined sodium carbonate per liter are added to the solution. The solution obtained is used to pad a cotton fabric in such a manner that the liquor pickup is 70%, and the fabric is then wound onto a batching roller. The cotton fabric is left in this manner at room temperature for 3 hours. The dyed material is then rinsed, soaped at the boil with a nonionic detergent for quarter of an hour, rinsed again and dried.

Dyeing Procedure V 6 parts of the reactive dye obtained according to Example 1 are dissolved in 50 parts of water. 50 parts of a solution containing 16 g of sodium hydroxide and 0.04 liter of waterglass (38° bé) are added to this solution. The solution obtained is used to pad a cotton fabric in such a manner that the liquor pickup is 70%, and the fabric is then wound onto a batching roller. It is left in this manner at room temperature for 10 hours. The dyed material is then rinsed, soaped at the boil with a nonionic detergent for quarter of an hour, rinsed again and dried.

Dyeing Procedure VI 2 parts of the reactive dye obtained according to Example 1 are dissolved in 100 parts of water with the addition of 0.5 part of sodium m-nitrobenzenesulfonate. The solution obtained is used to impregnate a cotton fabric in such a manner that its liquor pickup is 75%, and the fabric is then dried. It is then impregnated with a warm solution of 20° C. containing 4 g of sodium hydroxide and 300 g of sodium chloride per liter, squeezed off to a liquor pickup of 75%, and the dyeing is steamed at 100° to 102° C. for 30 seconds, rinsed, soaped in a 0.3% boiling solution of a nonionic detergent for quarter of an hour, rinsed and dried.

Printing Procedure I 3 parts of the reactive dye obtained according to Example 1 are rapidly stirred into 100 parts of a stock thickener containing 50 parts of 5% sodium alginate thickener, 27.8 parts of water, 20 parts of urea, 1 part of sodium m-nitrobenzenesulfonate and 1.2 parts of sodium bicarbonate. The printing paste thus obtained is used to print a cotton fabric, and the printed fabric obtained is dried and steamed at 102° C. in saturated steam for 2 minutes. The printed fabric is then rinsed and, if desired, soaped at the boil and rinsed again and then dried.

Printing Procedure II 5 parts of the reactive dye obtained according to Example 1 are rapidly stirred into 100 parts of a stock thickener containing 50 parts of 5% sodium alginate thickener, 36.5 parts of water, 10 parts of urea, 1 part of sodium m-nitrobenzenesulfonate and 2.5 parts of sodium bicarbonate. The printing paste thus obtained, whose stability fulfills the technical requirements, is used to print a cotton fabric, and the printed fabric obtained is dried and steamed at 102° C. in saturated steam for 8 minutes. The printed fabric is then rinsed and, if desired, soaped at the boil and rinsed again and then dried.

What is claimed is:

1. A reactive dye of the formula

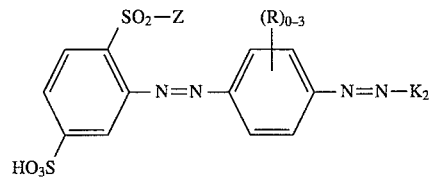

in which Z is β-sulfatoethyl, β-thiosulfatoethyl, β-phosphatoethyl, β-acyloxyethyl, β-haloethyl or vinyl;

$(R)_{0-3}$ are 0 to 3 substituents R selected from the group consisting of $C_{1-2}$alkyl, $C_{1-2}$alkoxy, hydroxy-$C_1$-$C_2$alkoxy, halogen, carboxyl, hydroxyl, amino, acetylamino and ureido; and $K_2$ is a radical of the formula

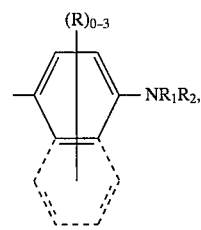

(2a)

-continued

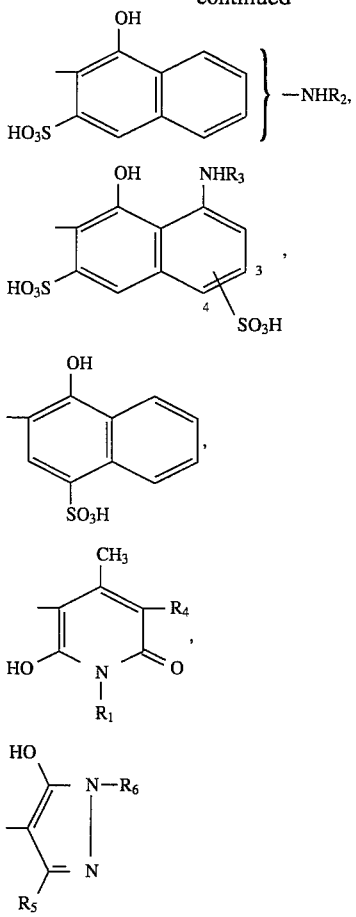

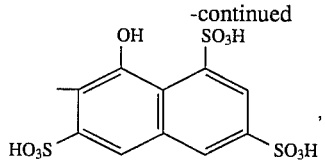

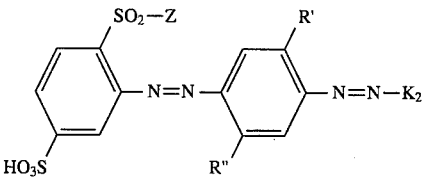

wherein $(R)_{0-3}$ and Z are as defined above, $R_1$ is hydrogen or $C_{1-4}$alkyl, $R_2$ is hydrogen, $C_{1-4}$alkyl, $C_{1-4}$alkanoyl or $C_{1-4}$hydroxyalkyl, $R_3$ is hydrogen, $C_{1-4}$alkyl, $C_{1-4}$alkanoyl, benzoyl or aminobenzoyl, $R_4$ is —$CONH_2$ or —$CH_2SO_3H$, $R_5$ is $C_{1-3}$alkyl or carboxyl, $R_6$ is chloro- or sulfo-substituted phenyl or naphthyl and the second sulfo group in formula (2c) is either in the 3 or 4 position.

2. A reactive dye according to claim 1 of the formula wherein R' is hydrogen, methyl, methoxy, hydroxy or hydroxyethoxy and R" is hydrogen, methyl or acetylamino.

* * * * *